(12) United States Patent
Constans et al.

(10) Patent No.: US 9,862,499 B2
(45) Date of Patent: Jan. 9, 2018

(54) HUMAN MACHINE INTERFACE FOR DISPLAYING INFORMATION RELATIVE TO THE ENERGY OF AN AIRCRAFT

(71) Applicant: Airbus Operations (S.A.S.), Toulouse (FR)

(72) Inventors: Florian Constans, Pibrac (FR); Mathieu Deroo, Tournefeuille (FR); Benjamin Mazoin, L'Union (FR)

(73) Assignee: Airbus Operations (S.A.S.), Toulouse (FR)

( * ) Notice: Subject to any disclaimer, the term of this patent is extended or adjusted under 35 U.S.C. 154(b) by 67 days.

(21) Appl. No.: 15/137,891

(22) Filed: Apr. 25, 2016

(65) Prior Publication Data

US 2017/0305571 A1    Oct. 26, 2017

(51) Int. Cl.
*G06F 19/00* (2011.01)
*B64D 43/00* (2006.01)
(Continued)

(52) U.S. Cl.
CPC ............ *B64D 43/00* (2013.01); *B64D 31/04* (2013.01); *B64D 31/06* (2013.01)

(58) Field of Classification Search
CPC ........ B64D 31/02; B64D 31/06; B64D 43/02; B64D 2045/001; B64D 25/00;
(Continued)

(56) References Cited

U.S. PATENT DOCUMENTS 2,449,084 A * 9/1948 Murray .................. B64C 13/50
                                                    244/102 A
3,043,159 A * 7/1962 Morse .................. B63H 21/213
                                                    477/112
(Continued)

FOREIGN PATENT DOCUMENTS

EP          1 508 517       2/2005
WO         2004022393       3/2004

OTHER PUBLICATIONS

French Search Report cited in French patent application No. FR 1161956, dated Sep. 11, 2012 (8 pages).

*Primary Examiner* — Khoi Tran
*Assistant Examiner* — Jorge Peche
(74) *Attorney, Agent, or Firm* — Nixon & Vanderhye P.C.

(57) ABSTRACT

A human machine interface linked to the throttle lever of an aircraft used to control the energy of an aircraft is disclosed. The HMI has upper part, which corresponds to the forward stroke of the lever, and a lower part, which corresponds to the rearward stroke of the lever. An upper shutter is positioned over the upper part, and a lower shutter is positioned over the lower part. A "cursor" acts as a visual representation in the HMI of the lever and its handle. The cursor moves forward or backward as the pilot acts on the lever/handle. The cursor indicates an ordered release of more or less aircraft energy, depending on its position on the display. The upper and lower shutters also indicate the ordered release of more or less aircraft energy, depending on the respective lengths of the two shutters. The HMI also includes a column (Continued)

in the display having a length symbolizing a current value in actual aircraft push or braking, depending on whether an aircraft push or braking has been ordered by releasing of more or less aircraft energy. The column changes in length as the actual aircraft push or braking changes. The cursor is further depicted in the HMI display as containing a memorizing button on the handle and a Go-Lever button on the lever below the handle.

23 Claims, 9 Drawing Sheets

(51) Int. Cl.
B64D 31/06 (2006.01)
B64D 31/04 (2006.01)

(58) Field of Classification Search
CPC .... B64D 31/10; B64D 45/00; B64D 45/0005; B64C 19/00; B64C 13/16; B64C 15/02; G05D 1/0061; G05D 1/0088; G05D 1/0638; Y10T 74/20396; Y10T 477/6805; B62D 1/12
See application file for complete search history.

(56) References Cited

U.S. PATENT DOCUMENTS

| | | | | | |
|---|---|---|---|---|---|
| 3,691,356 | A | * | 9/1972 | Miller | G05D 1/0661 244/181 |
| 3,789,661 | A | * | 2/1974 | Melsheimer | B64D 45/00 244/186 |
| 4,019,702 | A | * | 4/1977 | Annin | G05D 1/0661 244/180 |
| 4,043,526 | A | * | 8/1977 | Donley | G05D 1/0077 244/194 |
| 4,567,786 | A | * | 2/1986 | Sakurai | B64D 31/04 244/220 |
| 4,887,966 | A | * | 12/1989 | Gellerman | G06F 3/0383 434/45 |
| 4,912,642 | A | * | 3/1990 | Larsen | F02C 9/28 244/182 |
| 4,961,548 | A | * | 10/1990 | Adams | B64C 13/06 244/118.5 |
| 5,001,644 | A | * | 3/1991 | Goheen | B64D 31/12 60/224 |
| 5,029,778 | A | * | 7/1991 | DeLuca | B64D 31/02 244/175 |
| 5,039,037 | A | * | 8/1991 | DeLuca | G05D 1/0061 244/175 |
| 5,353,022 | A | * | 10/1994 | Middleton | G05D 1/0083 340/959 |
| 5,392,030 | A | * | 2/1995 | Adams | B60K 28/063 180/272 |
| 5,839,691 | A | * | 11/1998 | Lariviere | B64C 27/605 244/12.4 |
| 5,978,715 | A | * | 11/1999 | Briffe | G01C 23/00 244/1 R |
| 6,038,498 | A | * | 3/2000 | Briffe | G01C 23/00 244/1 R |
| 6,112,141 | A | * | 8/2000 | Briffe | G01C 23/00 345/1.3 |
| 6,880,784 | B1 | * | 4/2005 | Wilkinson | B64D 31/06 244/195 |
| 8,548,714 | B2 | * | 10/2013 | Andrieu | B64D 31/04 244/110 B |
| 8,774,989 | B1 | * | 7/2014 | Bush | B64D 43/02 340/952 |
| 8,866,745 | B1 | * | 10/2014 | Schrick | G06F 3/023 345/156 |
| 9,569,323 | B1 | * | 2/2017 | Gershzohn | G06F 11/2257 |
| 9,623,879 | B2 | * | 4/2017 | Ellis | B60W 50/087 |
| 9,646,509 | B2 | * | 5/2017 | Welles | G09B 9/05 |
| 2003/0052224 | A1 | * | 3/2003 | Bretscher | B64D 31/06 244/65 |
| 2003/0110759 | A1 | * | 6/2003 | Chapman | F02C 9/28 60/204 |
| 2005/0085958 | A1 | * | 4/2005 | Ashbolt | B64D 31/04 701/3 |
| 2005/0098681 | A1 | * | 5/2005 | Berson | G01H 17/00 244/1 N |
| 2006/0196473 | A1 | * | 9/2006 | Hasegawa | F02D 9/02 123/406.47 |
| 2007/0198141 | A1 | * | 8/2007 | Moore | B64D 43/00 701/3 |
| 2008/0208398 | A1 | * | 8/2008 | Delaplace | B64D 31/08 701/3 |
| 2009/0198414 | A1 | * | 8/2009 | Mohning | B60K 6/12 701/41 |
| 2009/0212975 | A1 | * | 8/2009 | Ausman | G01R 31/3277 340/945 |
| 2009/0302174 | A1 | * | 12/2009 | Ausman | B64D 45/0005 244/76 R |
| 2009/0320445 | A1 | * | 12/2009 | Dupre | B64D 31/10 60/228 |
| 2009/0325131 | A1 | * | 12/2009 | Cernasov | G06F 3/012 434/30 |
| 2010/0100262 | A1 | * | 4/2010 | Blanvillain | G05D 1/0072 701/14 |
| 2010/0125383 | A1 | * | 5/2010 | Caouette | B63H 21/17 701/21 |
| 2010/0250030 | A1 | * | 9/2010 | Nichols | G01C 23/005 701/7 |
| 2010/0292874 | A1 | * | 11/2010 | Duggan | G05D 1/0061 701/11 |
| 2011/0184623 | A1 | * | 7/2011 | De Boer | B64D 31/12 701/99 |
| 2012/0083946 | A1 | * | 4/2012 | Maldonado | G06Q 10/06 701/3 |
| 2012/0174559 | A1 | * | 7/2012 | Ling | F02C 9/16 60/204 |
| 2012/0299753 | A1 | * | 11/2012 | Thoreen | G01C 23/005 340/975 |
| 2013/0184900 | A1 | * | 7/2013 | Constans | B64D 31/04 701/3 |
| 2013/0190949 | A1 | * | 7/2013 | Constans | B64D 31/02 701/3 |
| 2013/0265425 | A1 | * | 10/2013 | Smailus | G01C 23/00 348/148 |
| 2014/0346280 | A1 | * | 11/2014 | Constans | B64C 19/00 244/175 |
| 2015/0001336 | A1 | * | 1/2015 | Eglin | B64C 27/04 244/6 |
| 2015/0013306 | A1 | * | 1/2015 | Shelley | F02K 5/00 60/224 |
| 2015/0120098 | A1 | * | 4/2015 | Catalfamo | G08G 5/02 701/16 |
| 2015/0158595 | A1 | * | 6/2015 | Guering | G05G 1/04 244/221 |
| 2015/0183511 | A1 | * | 7/2015 | Ott | B64C 19/00 244/50 |
| 2015/0246725 | A1 | * | 9/2015 | Reilly | B64C 27/605 244/92 |
| 2015/0284102 | A1 | * | 10/2015 | Swann | F02C 9/16 701/3 |
| 2015/0284103 | A1 | * | 10/2015 | Swann | B64D 31/10 701/3 |
| 2015/0364045 | A1 | * | 12/2015 | Lissajoux | G08G 5/0021 701/3 |
| 2016/0062356 | A1 | * | 3/2016 | Worden | G05D 1/0027 701/2 |
| 2016/0129992 | A1 | * | 5/2016 | Moune | B64C 15/02 701/14 |
| 2016/0144948 | A1 | * | 5/2016 | Sparks | B64C 13/04 74/519 |
| 2016/0207633 | A1 | * | 7/2016 | McWaters | B64D 27/04 |
| 2017/0015432 | A1 | * | 1/2017 | Ferreira | B64D 31/04 |
| 2017/0081974 | A1 | * | 3/2017 | Xiong | F02C 9/28 |

(56) References Cited

U.S. PATENT DOCUMENTS

2017/0096154 A1* 4/2017 Hurst .................... B61L 25/025
2017/0145956 A1* 5/2017 Miller .................... F02K 1/763
2017/0213474 A1* 7/2017 Welles ................... G09B 9/052

* cited by examiner

HUMAN MACHINE INTERFACE FOR DISPLAYING INFORMATION RELATIVE TO THE ENERGY OF AN AIRCRAFT

The present invention relates to a system for controlling an aircraft, and more particularly to a human machine interface linked to the throttle lever of an aircraft used to control the aircraft.

BACKGROUND OF THE INVENTION

Today, aircraft typically include a flight control system which allows automatic control of the aircraft for improved aircraft handling. In this regard, flight control systems generally seek to achieve control of an aircraft's velocity, attitude and position by controlling the aircraft aerodynamic control surfaces and/or the thrust provided by the aircraft's engines. Flight control systems typically include flight, navigation, engine and system displays for pilot information, control devices for pilot interaction, computer systems for flight management and control, including flight guidance using autopilot (AP) and autothrottle (ATHR), sensors for measuring aircraft states, and actuators for executing commands. Typically, a flight control system allows a pilot to fly an aircraft in a manual mode, where the pilot uses a stick or yoke and pedals to control the aircraft, in a managed mode, where a pre-programmed flight plan is used to control the aircraft, and in an automatic mode, where a flight control unit controls the aircraft, and in which the autopilot/autothrottle calculates control signals which are executed by the flight control unit.

One of a pilot's tasks is to monitor and control the energy level of an aircraft to maintain the aircraft at an appropriate energy level throughout the flight phase to keep the aircraft's flight path, speed, thrust and configuration, or to recover the aircraft from a low energy or high energy situation, i.e., from being too slow and/or too low, or being too fast and/or too high. The level of energy that an aircraft has is a function of various flight parameters and their rate of change, including airspeed and speed trend, altitude and vertical speed (or flight path angle), aircraft configuration (i.e., drag caused by speed brakes, slats/flaps and/or landing gear), and thrust level. Controlling the aircraft energy level requires continuously controlling the flight controls. Autopilot and flight director modes, aircraft instruments, warnings and protections are designed to assist the pilot in controlling an aircraft's energy level.

The phrase "energy of an aircraft" is understood herein to mean the total energy of an aircraft, i.e., the sum of the kinetic energy and the potential energy of an aircraft. The principal devices for controlling and modulating the energy of an aircraft are the aircraft's engines (push and pull back), controlling aircraft surfaces, such as the air-brakes (spoilers), and the aircraft's wheel brakes (for ground phases). The solution provided by the present invention relates to all phases of the operation of an aircraft, i.e., on the ground (i.e., taxiing, takeoff and landing) and in flight (i.e., climbing, cruising, descending and approaching landing). Information related to the control of an aircraft's kinetic energy is typically distributed in the aircraft cockpit in the following way: (i) a throttle lever for controlling engine thrust; (ii) a lever for deploying the air-brakes or any element for controlling the drag on an aircraft; (iii) a lever for controlling an aircraft's wheel brakes; (iv) levers for thrust reversers for each engine; (v) switches and/or buttons for selecting various push modes; and (vi) switches and/or buttons for the activation of the ATHR (i.e., the autothrottle for aircraft thrust).

U.S. Patent Application Publication No. US 2014/0346280, the entire contents of which is incorporated herein by reference, discloses a system for controlling an aircraft control parameter, such as one which is a function of aircraft energy. The system includes a control interface with a mobile element configured to move on a travel, of which at least two portions are separated by a neutral position, a return element for returning the mobile element back to the neutral position when it is not actuated, an interaction element, and a control unit configured to memorize an item of information corresponding to a first position of the mobile element at an instant of activation of the interaction element. The control unit is also configured to generate a set point of the aircraft control parameter, as a function of a control associated with the first position of the mobile element for which the information has been memorized, or a current position of the mobile element, when this current position is situated on the same portion of travel as the first position and is more remote than the latter from the neutral position.

BRIEF SUMMARY OF THE INVENTION

The present invention relates to controlling the energy of an aircraft, and more particularly to a human machine interface (HMI) linked to the throttle lever of an aircraft used to control the energy of an aircraft. The HMI is divided into two parts, that is, a first or upper part, which corresponds to the forward stroke of the lever, and a second, or lower part, which corresponds to the rearward stroke of the lever. Two shutters are placed on the two parts, that is, a first or upper shutter positioned over the first or upper part, and a second or lower shutter positioned over the second or lower part. Alongside the two shutters is a "cursor", which is a visual representation in the HMI of the lever/handle on which the pilot acts to control an aircraft. The cursor moves forward or backward as the pilot acts on the lever/handle. The HMI also includes a scale, which is a numerical percentage indication of a release of more or less aircraft energy. The cursor indicates an ordered release of more or less aircraft energy, depending on its position on the scale. The upper and lower shutters also indicate the ordered release of more or less aircraft energy, depending on the respective lengths of the two shutters. The lengths of the two shutters on the scale are determined by the positions of the ends of such shutters on the scale, which, in turn, can be delineated by two flag like indicators, respectively, bearing the acronyms "THR" for throttle and "BK" for brake. The HMI also includes a column in the display having a length or height symbolizing a current value in actual aircraft thrust or braking, depending on whether an aircraft push or braking has been ordered by the releasing of more or less aircraft energy. The column changes in length or height as the actual aircraft thrust or braking changes, and the length of the upper shutter or the lower shutter changes in response to the ordered value in an increase or a decrease in the energy of the aircraft. Finally, the cursor is further depicted in the HMI display as containing representations of switches depicted as a memorizing button on the handle and the memorizing button's activation position and as a Go-Lever button on the lever below the handle and the Go-Lever button's activation position.

DETAILED DESCRIPTION OF THE INVENTION

Figure 1:
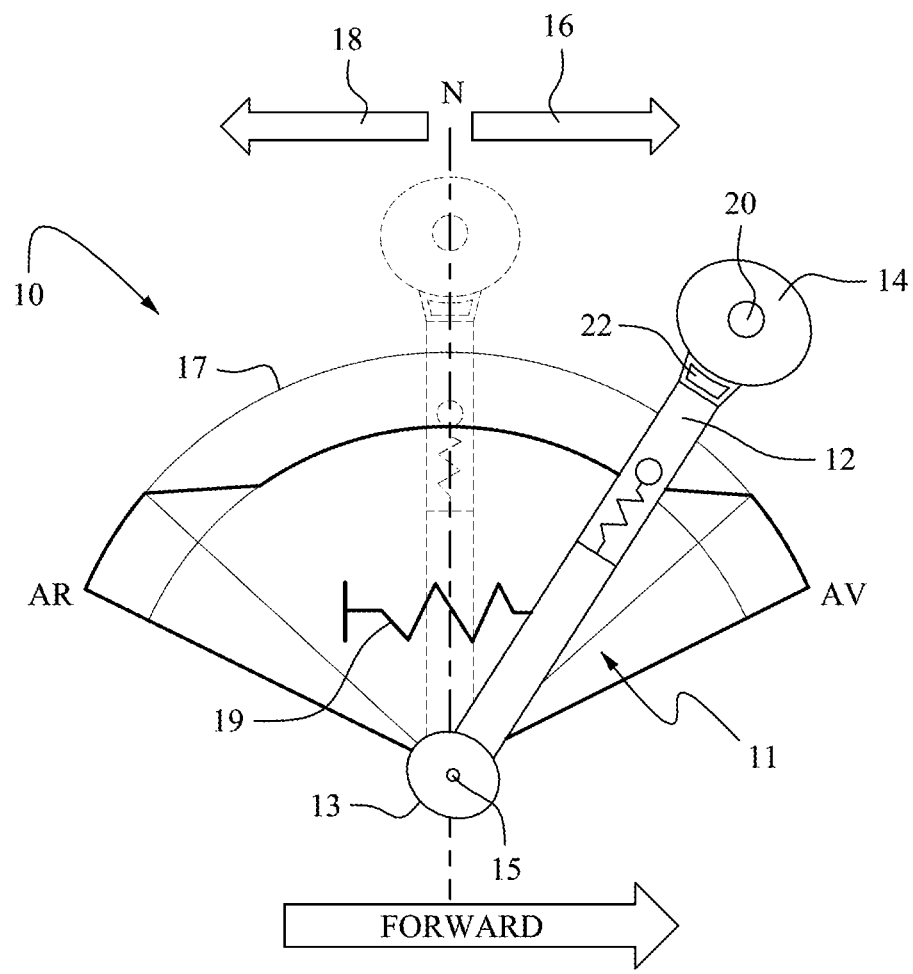
FIG. 1 is an exemplary embodiment of a control interface which is part of a system for controlling the energy of an aircraft.

FIG. 1 depicts an exemplary embodiment of a control interface 10 which is part of a system for controlling the energy of an aircraft. The control interface 10 is similar to the control interface disclosed in U.S. Application Publication No. US 2014/0346280. The control interface 10 includes a mobile element 11 including a lever 12 equipped at its free end with a handle 14. Another end 13 of the lever 12 is rotatable around an axis 15 orthogonal to the plane of FIG. 1. This rotation enables movement by the handle 12 along a travel 17 between an extreme reverse position (AR) and an extreme forward position (AV). Thus, the handle 12 has two directions of travel, i.e., forward 16 and backward 18, which are separated by a neutral position N. An element 19, such as a spring, urges the handle 12 to return to the neutral position N when the pilot is no longer holding the handle 12, so that the handle 12 is not being actuated.

The handle 12 shown in FIG. 1 has several functional modes of operation, i.e., a manual operation mode, an automatic operation mode, a memorizing function mode and a release of operations mode.

The manual operation mode is mainly used when an airplane is taxiing on the ground because the pilot must be able to make the airplane accelerate (lever forward) or decelerate (lever backward) when the plane is taxiing. Thus, when the pilot wishes to increase the aircraft energy so as to accelerate the airplane, he can initiate a thrust order by displacing the lever 12 in the forward travel direction 16, with which a control of the aircraft's engine thrust is associated. When the pilot wishes to decrease the aircraft energy so as to decelerate the aircraft, he can initiate a braking of the aircraft by displacing the lever 12 in the reverse travel direction 18, with which is associated a control of the aircraft's wheel brakes and/or airbrakes when the aircraft is on the ground. When the aircraft is in flight, this control corresponds to a control of the aircraft's air-brakes.

In the automatic operation mode, a pushing monitoring system manages the push in a pre-allocated range of authority. The pilot can increase this range forwards by forcing a maximum push called TOGA (for Take-Off/Go-Around thrust) or increase the range of authority backwards (authorization to deploy the air-brakes).

The function for the release of operations makes it possible to activate certain specific operations during flight (activation of takeoff, activation of a go-around, etc.). The interface for this is a "Go-Lever" button 22 which is arranged on the lever 12 just below the handle 14 for triggering the TO/GA functions corresponding to the maximum thrust of the aircraft engines associated with the activation of certain specific aircraft operations during flight, such as the activation of takeoff or the activation of a go-around, which may occur on an approach to land.

The memorizing function makes it possible to memorize a particular position of the handle. The lever 12 also includes a memorization button 20 arranged on the handle 14 of the lever 12 for holding thrust or deceleration settings. Once a storage interface is activated, the order to push, drag (spoiler) or brake using corresponding wheel brakes is stored by the flight control system and continues to be applied even if the handle 14 and lever 12 are then released by the pilot.

The present invention is directed to an extension of the foregoing functions through the use of a human machine interface (HMI) which is coupled with the lever 12 and handle 14 shown in FIG. 1, and which integrates the various methods for controlling the energy of the aircraft, i.e., (i) engine thrust (all of the engines), (ii) the aerodynamic braking surface for generating drag: e.g., air-brakes (spoilers) or any other element, (iii) the braking carried out by the brakes available on the aircraft landing gear, and (iv) thrust reversers for each engine, with a single lever and handle, like the lever 12/handle 14 shown in FIG. 1. The presentation of all of the information concerning the control of aircraft energy is currently not adapted to the concept of a unique handle, like the lever 12/handle 14 shown in FIG. 1, since this does not correspond to the global concept of this kind of handle. Indeed, the objective of the present invention is to make transparent to the pilot all the means of controlling aircraft energy by providing a single HMI that performs this function.

The HMI described herein consists of a display for transmitting to a pilot the information relevant to controlling aircraft energy, either through visual or haptic (sense of touch) feedback. This control is done either manually or automatically via an automatic control (i.e., the autothrottle ATHR). The following information is provided visually by the HMI to make the device suitable for representing the physical device in the interface. This information includes:

The presentation of the maximum limits (acceleration) and minimum limits (in deceleration) of the lever race.

The representation of the position of the handle within these acceleration and deceleration limits.

The representation of associated buttons, including: (1) a memory button: (i) of a push/deceleration ordered value (in manual), and (ii) of a range of authority (in ATHR); (2) and a Go-Lever which enables automatic triggering of a flight phase change, including: (i) takeoff when the plane is aligned, and (ii) go-around in an approach phase.

The representation of the current value of: (1) forward (thrust), and (2) backward (deceleration or braking).

The representation of the controlled value, including: (1) for the pilot (manual mode): (i) forward (thrust), and (ii) backward (deceleration or braking); (2) for automation (ATHR): (i) forward (thrust), and (ii) backward (deceleration or braking).

The representation of the range of authority allocated to the control system: (1) forward the front (maximum thrust), and (2) backward (maximum deceleration).

Related information, including: (1) activated modes (Flex, Climb, TOGA, Auto-delay Brake To Vacate): (i) TOGA: automatic mode of application of the maximum thrust (TOGA thrust); (ii) Flex automatic mode using a reduced thrust during takeoff or during go-around compared to the maximum thrust (TOGA); (iii) Climb: automatic mode using a reduced thrust for the climbing phase compared to the maximum thrust (TOGA); (iv) Self-delay: Automatic mode to reduce the thrust toward the IDLE level during the flare-out phase on landing; (v) Brake-To-Vacate (BTV): automatic braking mode to reach an exit ramp at an adequate speed while optimizing runway occupation time and brake wear; (vi) Max rejected takeoff (RTO) braking mode using all the aircraft's braking capacity following cancellation of take-off; and (vii) (Soft RTO: optimized braking mode following the take-off cancellation (no systematic application of full deceleration, if conditions allow).

(2) Some specific information is transmitted to the pilot haptically: (i) the presentation of the maximum limits (acceleration) and minimum limits (deceleration) of the handle race; (ii) the representation of the position of the handle in these limits; (iii) the representation of the activation position memorization button; and (iv) the representation of the activation position of the "Go-Lever" button.

To display all of the foregoing information, the HMI of the present invention is dedicated to the lever/handle used by the pilot to control the aircraft. For the HMI to be effective, it addresses the lack of homogeneity between the gesture to perform and visual feedbacks. To do so, it reproduces the elasticity effect associated with the functioning of the lever used by the pilot to control the aircraft. This results in a preferred HMI in which: (i) the HMI is vertically presented; (ii) the kinetic energy of an aircraft is integrally presented; and (iii) the physics associated with a return to the neutral position of the lever as soon as the pilot releases the lever are reproduced in the display.

Figure 2:
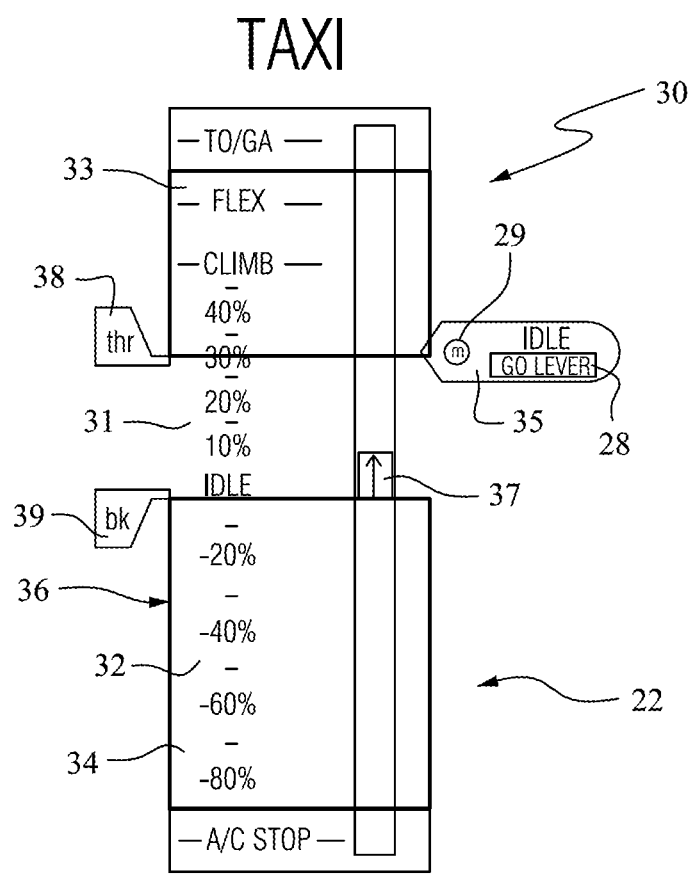
FIG. 2 generally depicts the HMI of the present application.

A preferred, vertical embodiment of a human machine interface (HMI) display 30 according to the present invention is shown in FIG. 2. The display can be, by way of example, a tactile pad external to the cockpit screens, or a display screen of the cockpit. The display can also be interactive (touch activated functions) or passive, or both. The interface 30 is divided into two parts: (1) a first or upper part 31, which corresponds to the forward stroke of the lever 12, and (2) a second, or lower part 32, which corresponds to the rearward stroke of the lever 12. Two "shutters" are placed on the two parts, that is, a first or upper shutter 33 positioned over the upper part 31, and a second or lower shutter 34 positioned over the lower part 32. The shutters 33 and 34 are shown in FIG. 2 as square or rectangular shapes delineated using bold black lines. However, in an actual HMI display, the shutters can be "highlighted" through the use of different colors or different shades of a color for the shutters 33 and 34 versus the portions of the upper and lower parts 31 and 32 of the display 30 not covered by the shutters.

Alongside the two shutters is a "cursor" 35, which is a visual representation in the interface 30 of the lever 12/handle 14 on which the pilot acts to control an aircraft. The cursor 35 moves forward or backward as the pilot acts on the lever 12/handle 14. The interface display also includes a scale, which is a numerical percentage or other relative or absolute indication of a release of more or less aircraft energy. The cursor 35 indicates an ordered release of more or less aircraft energy, depending on its position on the scale 36. The upper and lower shutters 33 and 34 also indicate the ordered release of more or less aircraft energy, depending on the respective lengths of the two shutters. The lengths of the two shutters on the scale 36 are determined by the positions of the ends of such shutters on the scale 36, which, in turn, can be delineated by two flag like indicators 38 and 39, respectively, bearing the acronyms "THR" for throttle and "BK" for brake in FIG. 2.

The shutters 33 and 34 used in the interface display 30 can be analogized to the principle of a water lock, wherein, depending on the extent the door of the water lock is opened, more or less water escapes from the lock. In this analogy, the aircraft energy is associated with the current of the escaping water. The commanded value for increasing or decreasing aircraft energy is represented by one of the shutters 33 and 34, which are symbolized by the door of the lock, which can be raised or lowered.

The interface 30 also includes a column 37 having a length or height symbolizing a current value in actual aircraft push or braking, depending on whether an aircraft push or braking has been ordered. The column 37 changes in length or height and direction as the actual aircraft push or braking changes, and the length of either the upper shutter 33 or the lower shutter 34 changes in response to the ordered value in the increase or decrease in the energy of the aircraft. Finally, the cursor 35 is further depicted in the interface display 30 as containing representations of a memorizing button 29 corresponding to the actual memorizing button 14 on the handle 14 and the memorizing button's activation position (i.e., ON or OFF) and a Go-Lever button 28 corresponding to the actual memorizing button 22 on the lever 12 below the handle 14 and the Go-Lever button's activation position (i.e., ON or OFF).

Figure 9:
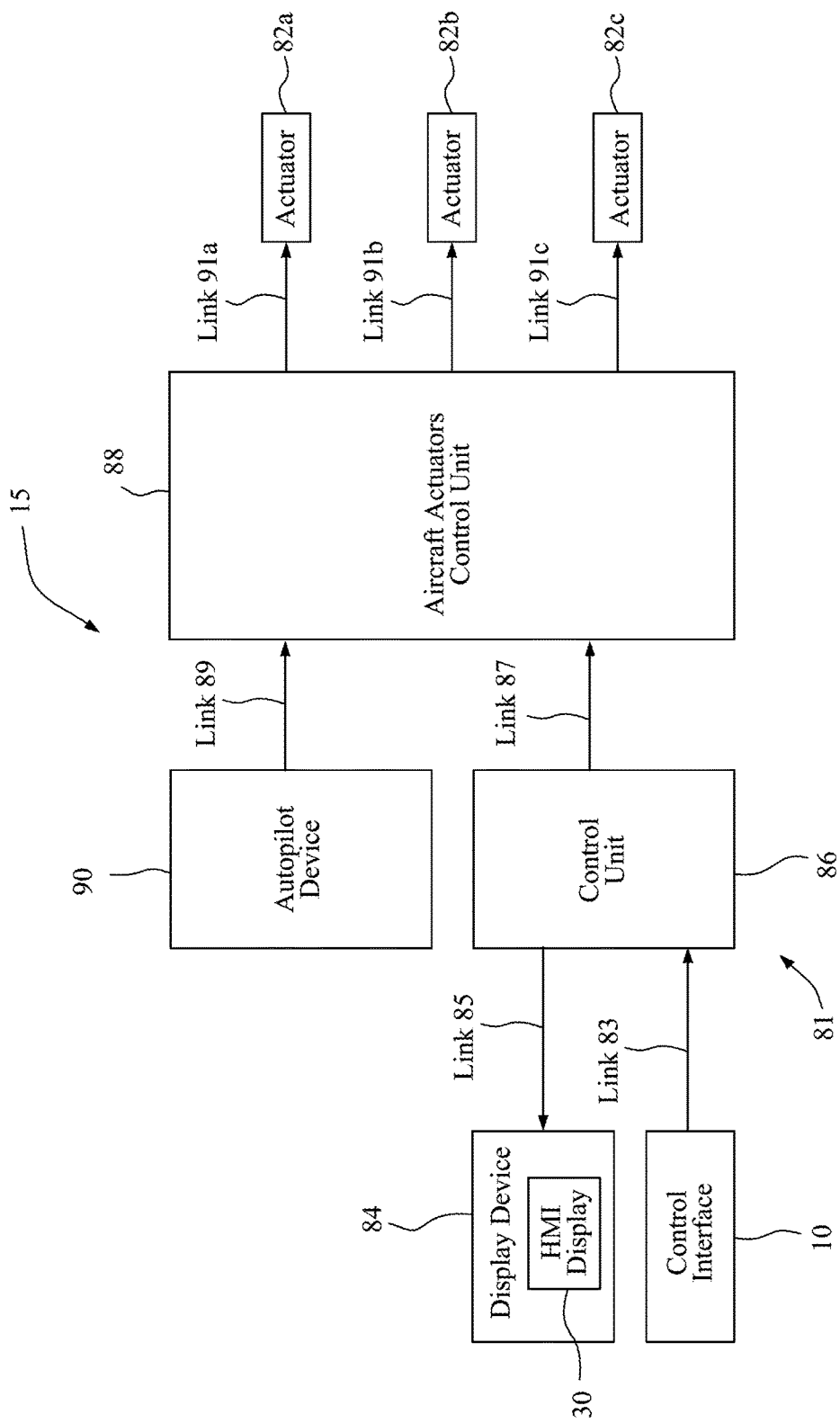
FIG. 9 is a simplified schematic of a system for controlling the control interface used to control the energy of an aircraft.

FIG. 9 is a simplified schematic of a system 81 for controlling the control interface 10 shown in FIG. 1 of this application, which is used to control the energy of an aircraft. The system is similar to the system 1 for controlling an aircraft control parameter depicted in FIG. 1 of U.S. Patent Application Publication No. US 2014/0346280. The system 81 includes a control unit 86 and a display device 84, which includes the HMI display 30. The control interface 10 is linked to the control unit 86 by a link 83 and the control unit 86 is linked to the display device 84 by a link 85. An aircraft autopilot device 90 and the control system 81 are linked to a unit 88 for controlling aircraft actuators by respective links 89 and 87. The actuator control unit 88 controls a set of actuators 82a, 82b, 82c by links 91a, 91b and 91c, respectively, for various aircraft functions, including flight control. The actuators may be electrical, hydraulic and/or pneumatic in nature.

Figure 3:
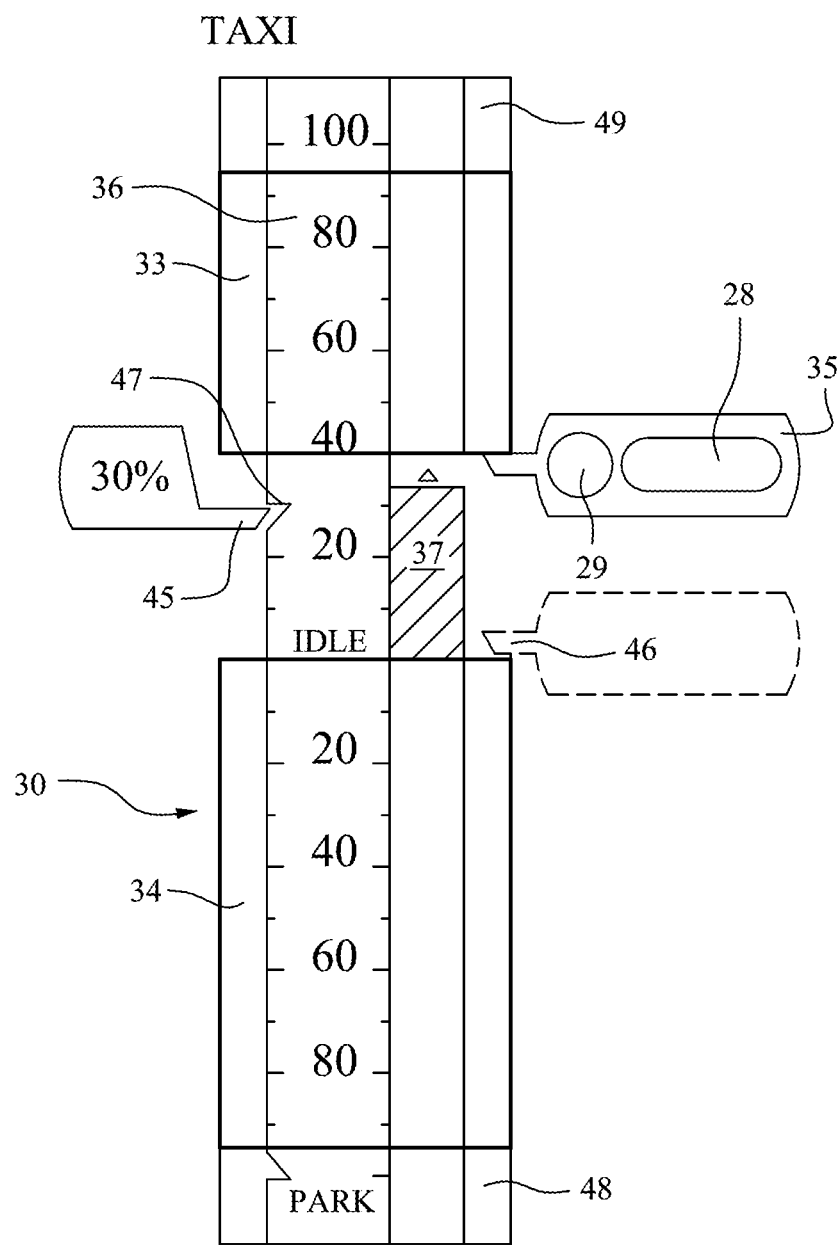
FIG. 3 depicts the HMI of the present application in manual mode.

FIG. 3 depicts the HMI display 30 of the present invention in manual mode. In FIG. 3, the shutters 33 and 34 represent the ordered values of the release of more or less aircraft energy, and the column 37 represents the actual push 45 provided by the aircraft engines. The lever 12/handle 14 is symbolized by the cursor 35 containing the two buttons, that is, the memorizing button 29 and the Go-lever button 28.

The symbolized lever or cursor 35 follows the stroke of the lever 12/handle 14 handled by the pilot. This following is achieved using sensors on the actual handle 12 which are feed into the control unit 86, which is a computer, and which drives the display device 84, and thus the interface display 30. The control unit 86 is preferably a computer. With the "effect of gravity" (elasticity), when the pilot releases the lever 12/handle 14, the symbolized lever/handle depicted as cursor 35 and the shutter 33 fall down towards the neutral or IDLE position 46, unless the memorization button 29 was pressed so as to have left a mark 47 on the scale 36. In this case, the cursor 35 falls down to the neutral position 46 from the memorization position 45, but the shutter 33 remains "blocked" by the memorization mark 47.

At the two ends of the main shutters 33 and 34, two small "shutters" 48 and 49, which indicate the extreme values that will be automatically memorized when the position of the cursor 35 reaches these values. The values which can be memorized automatically correspond to automatic modes suggested according to the conditions of rolling or flying, depending on the situation of an aircraft. The small shutters 48 and 49 are shown in FIGS. 2-9 as square or rectangular shapes, which are not delineated using bold black lines so as to distinguish them from the main shutters 33 and 34. Here again, in an actual HMI display, the shutters 48 and 49 can be "highlighted" through the use of different colors from the colors used for the shutters 33 and 34 or different shades of a color used for all of the shutters 33, 34, 48 and 49 versus the portions of the upper and lower parts 31 and 32 of the display 30 not covered by any of these shutters.

Figure 4:
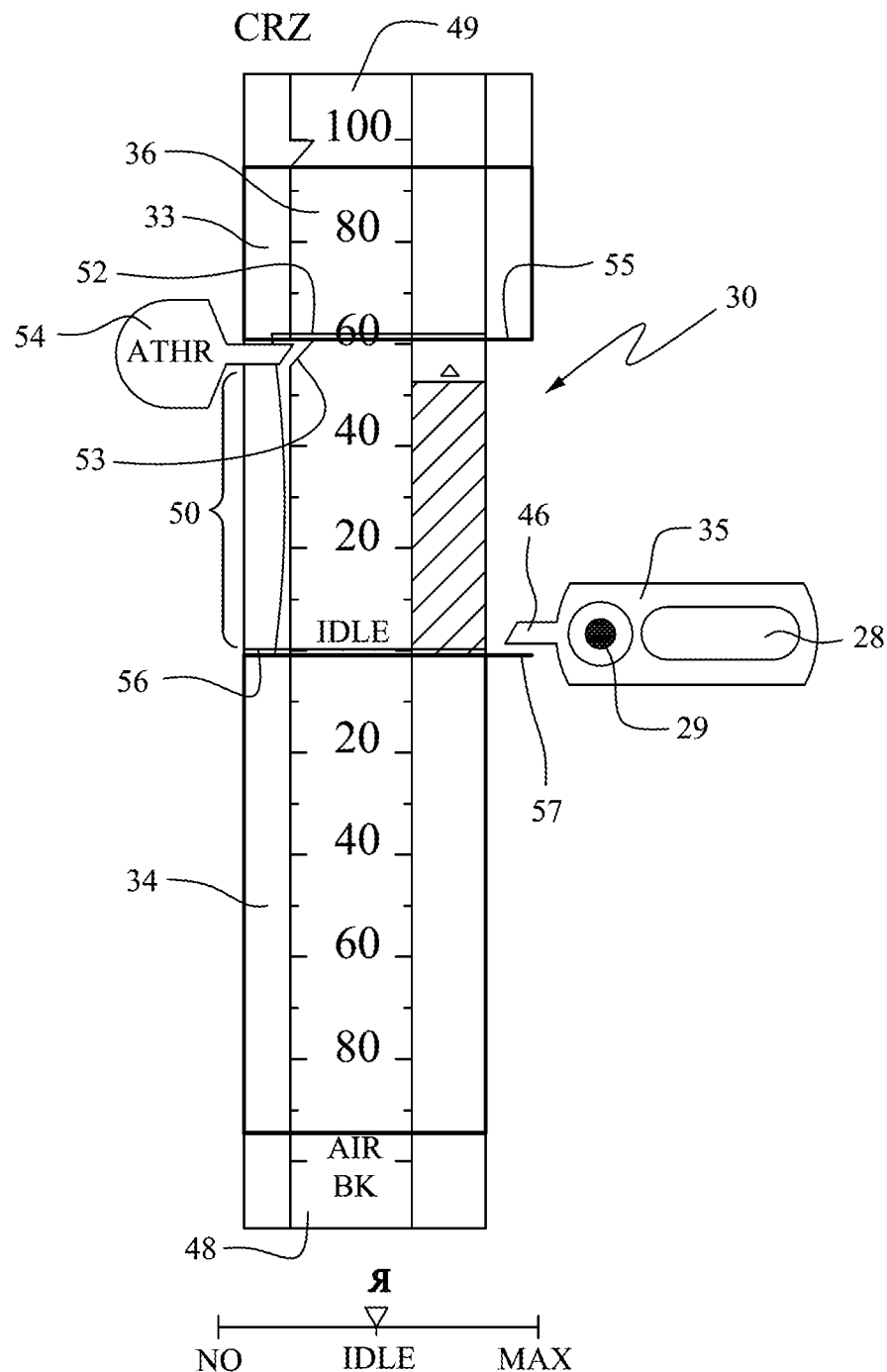
FIG. 4 depicts the HMI of the present application with the automatic mode (ATHR) activated.

In the automatic mode (ATHR) of operation, after takeoff, which is detected by the use of the Go-Lever button while the aircraft is still on the ground, a range indicator 50 appears automatically in the interface display 30, as shown in FIG. 4. The range 50 includes an upper bar 55 and a lower bar 56, which corresponds to where the value 52 ordered by the ATHR is located. A mark 53 is also added to the scale 36 in the upper part 33 of the display 30, which symbolizes the ordered value 52 in the increase in the energy of the aircraft, with the mark serving to block the upper shutter when the lever 12 is released and the cursor 35 returns to the neutral position 46. The display 30 also includes a flag-like symbol 54 with the acronym ATHR indicating the value in the increase in the energy of the aircraft ordered by the automatic mode. The lower shutter 34 is then reduced in width in the interface display 30, so that it becomes impossible for the cursor 35 move down into the lower part 34 of the display 30 to thereby order an air-brake value corresponding to a reduction in aircraft energy.

Figure 5:
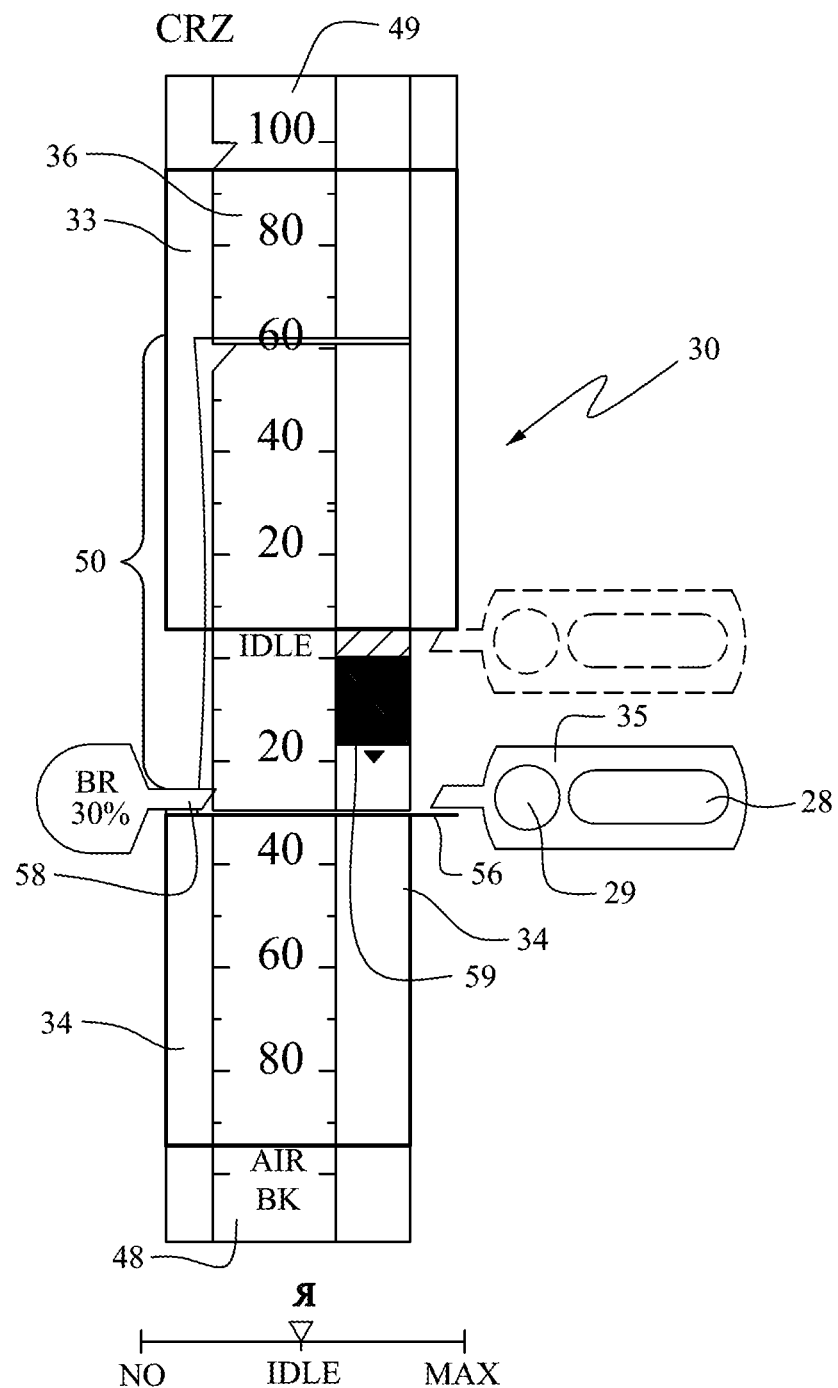
FIG. 5 depicts the HMI of the present application with the exit of the air-brakes mode activated.

As shown in FIG. 5, when the state of the memorization button 29 appears "hollow", this confirms the impossibility of engaging it. If the push/increase in aircraft energy ordered by the automatic mode (ATHR) goes back to the IDLE, as evidenced by the cursor 35 being at the IDLE position 46, as shown in FIG. 4, the memorization button 29 appears "full", as depicted by the black circle shown in the memorization button 29. In addition, the lower bar 56 of the range 50 widens until the limit 57 of the interface 30. This increase in the width of the lower bar 56 of the range 50 means that the pilot can increase the range 50 backwards into the lower part 34, thus making it possible for the automatic push to order an air-brake value 58, as shown in FIG. 5. The ordered value is shown as being 30% of the minimum in aircraft energy shown by shutter 48, which includes the acronym AIR BK shown in FIG. 5 within shutter 48. In this case, the aircraft energy is reduced with some inertia as the actual value 59 of air-brake is increased, which actual value 59 is depicted by the black column shown FIG. 5.

Descriptions of particular cases of use of the HMI are described below.

Figure 6:
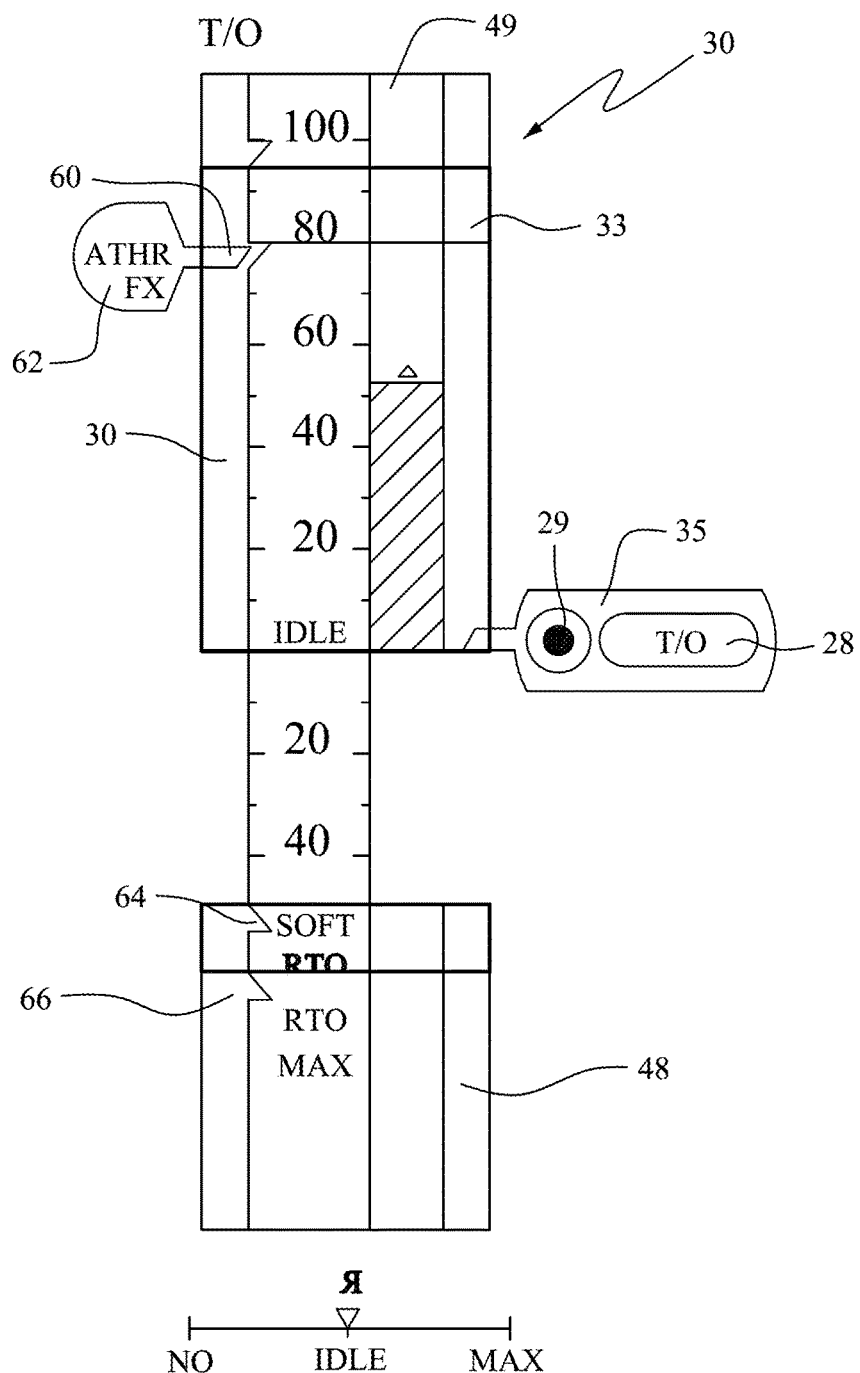
FIG. 6 depicts the HMI of the present application in phase of RTO.

Referring to FIG. 6, during the takeoff phase on the ground, the Go-Lever button 28 shown in the display 30 on cursor 35 is labeled with the acronym "T/O". The pilot presses the "T/O" labeled button 22 on the lever 12 shown in FIG. 1. The automatic mode (ATHR) push appears with the value 60 corresponding to the automatic mode "FLEX". The display 30 again includes a flag-like symbol 62 with the acronym ATHR FX located at the value in the increase in the energy of the aircraft ordered by the automatic mode ATHR FX. The higher shutter 33 is automatically placed at this ordered value 60. The back shutters 48 and 49 change configurations; they present the positions to be reached to activate the rejected takeoff RTO "software" and the rejected takeoff RTO "MAX". The notches 64 and 66 present the exact positions to activate the RTO "software" and the RTO "MAX".

Figure 7:
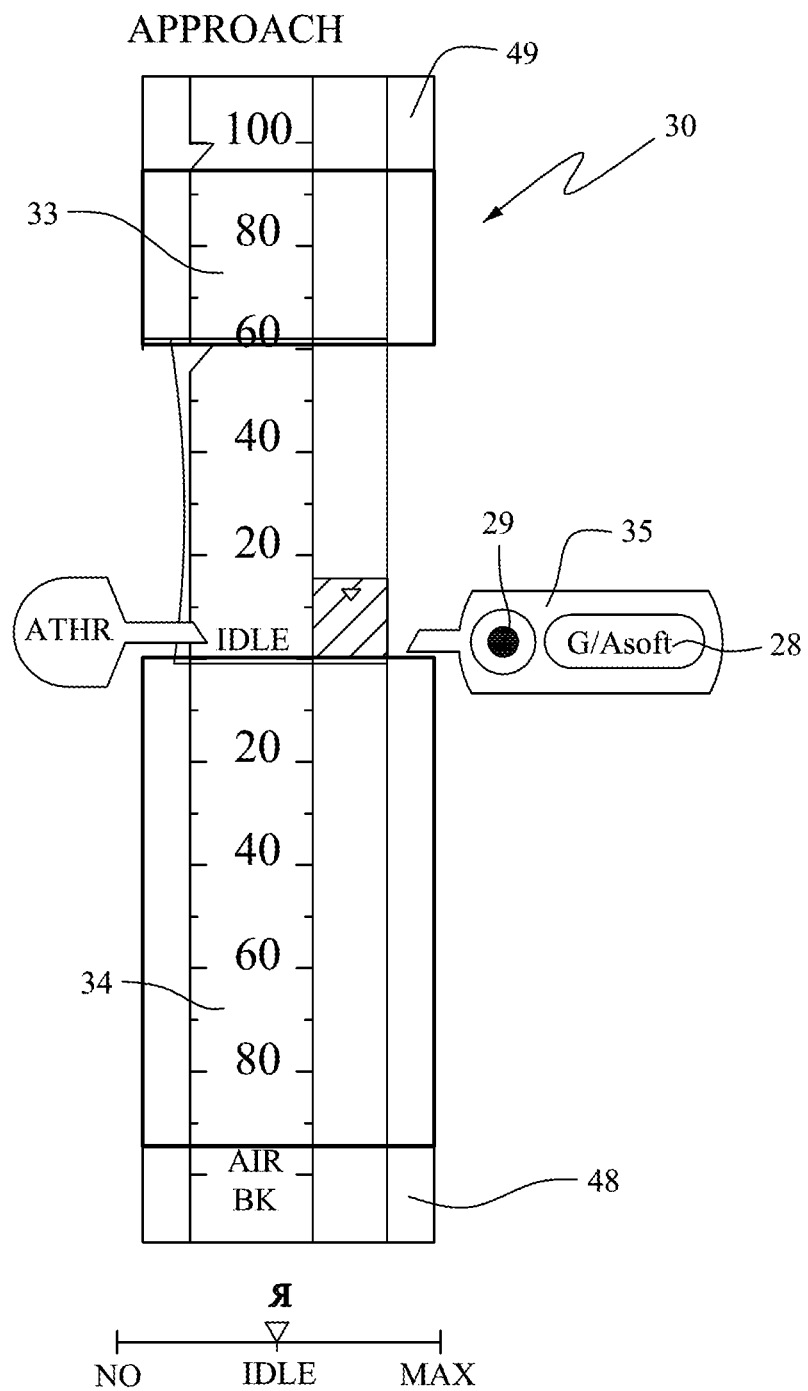
FIG. 7 depicts the HMI of the present application in phase of approach.

Referring to FIG. 7, during the approach phase, evidenced by the acronym APPROACH appearing at the top of display 30, the oval button 28 inside the cursor 35, which is the visual representation of the lever 12, is labeled with the acronym G/A SOFT. By pressing the oval button 28, the pilot engages a go-around.

Figure 8:
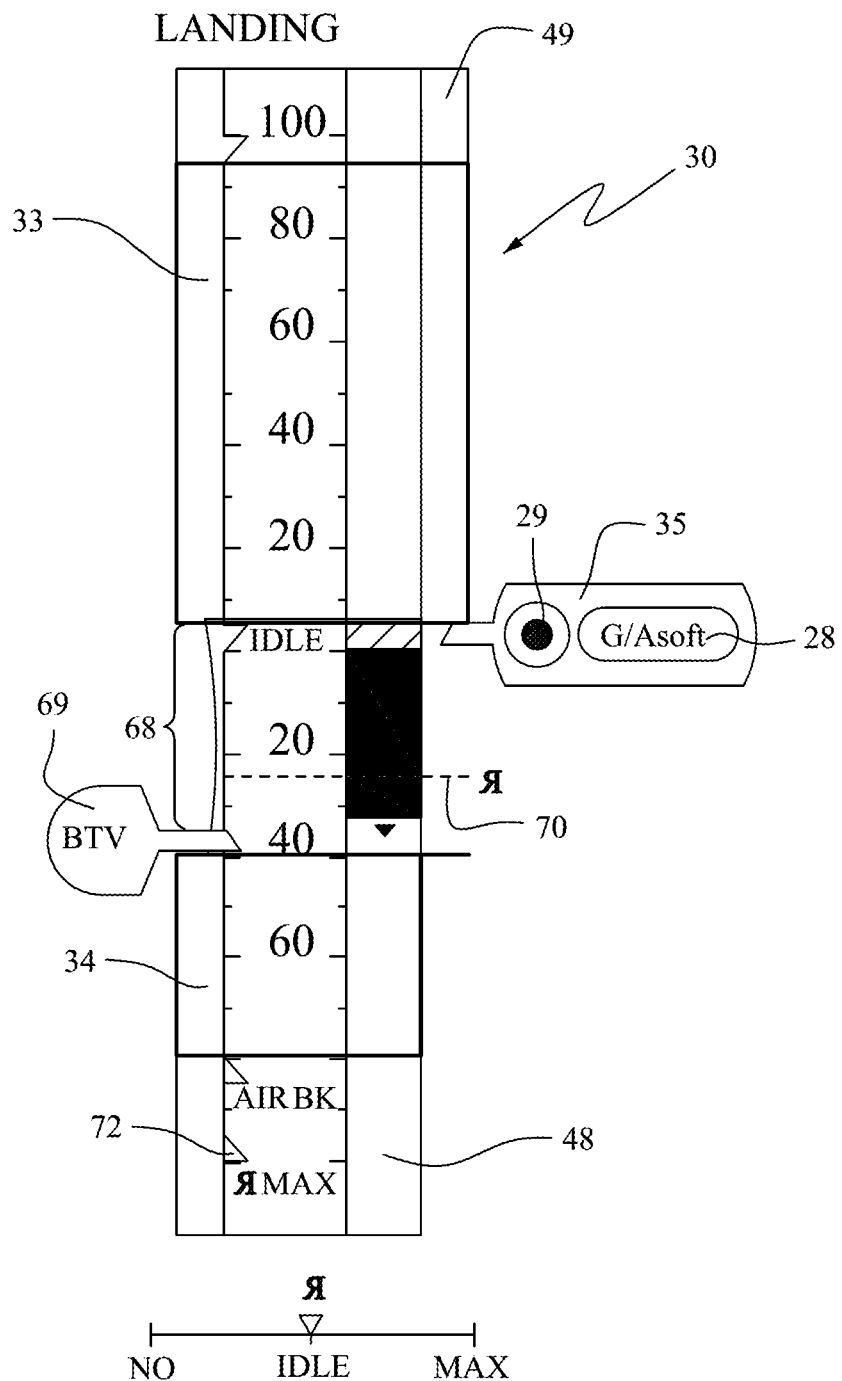
FIG. 8 depicts the HMI of the present application at the time of the exit of the reverses.

Referring to FIG. 8, during the landing phase, the range 68 of the automatic mode (ATHR) push moves automatically backwards into the lower part 32, in order to become a range of authority for automatic braking. The principle remains the same one as that describing the range of authority for a positive push, as shown in FIG. 4. If the automatic mode of braking BTV is engaged, label "ABK" (for AutoBrake) becomes "BTV" in flag label 69. Depending on to the engaged mode (NO/IDLE/MAX), the thrust reversers are presented in the HMI in two different ways: (i) a highest rate of braking before using the thrust reversers, which appears in the form of a limit 70, and (ii) a highest rate of deceleration of the plane using the brakes at a maximum and the thrust reversers, which appears in the form of a second limit 72, placed in the second, lower shutter 48.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An interface for displaying information relative to the energy of an aircraft, the interface being a display comprising:

a cursor symbolizing and corresponding to a lever handled by a pilot to control the energy of the aircraft, a first part corresponding to a first direction in which the lever is moved to increase the energy of the aircraft, a second part corresponding to a second direction in which the lever is moved to decrease the energy of the aircraft, a neutral position located between the first and second parts, the cursor being movable so as to follow actual strokes of the lever to increase or decrease the energy of the aircraft, and to return to the neutral position in the race when the lever is not being handled, a first shutter positioned over the first part of the display which changes in length as the cursor moves in the first part of the display, the length of the first shutter symbolizing an ordered value in the increase in the energy of the aircraft, a second shutter positioned over the second part of the display which changes in length as the cursor moves in the second part of the display, the length of the second shutter symbolizing an ordered value in the decrease in the energy of the aircraft, a first column having a length symbolizing a current value in actual aircraft push, the first column changing in length as the actual aircraft push changes and the length of the first shutter changes in response to the ordered value in the increase in the energy of the aircraft, a second column having a length symbolizing a current value in actual aircraft braking, the second column changing in length as the actual aircraft braking changes and the length of the second shutter changes in response to the ordered value in the decrease in the energy of the aircraft, and a plurality of switches, including one for memorizing a selected aircraft push or aircraft deceleration when the lever is operated in a manual mode, and for setting a range of authority when the lever is operated in an automatic mode, and one which enables automatic triggering of a flight phase change when the lever is operated in an automatic mode.

2. The interface according to claim 1, wherein the first part includes a first scale to provide measures of ordered and actual values in the increase in the energy of the aircraft, and wherein the second part includes a second scale to provide measures of ordered and actual values in the decrease in the energy of the aircraft.

3. The interface according to claim 2, wherein the first scale depicts ordered values in the increase in the energy of the aircraft and actual values of aircraft push as percentages of a maximum limit in aircraft energy, and wherein the second scale depicts ordered values in the decrease in the energy of the aircraft and actual values of aircraft braking as percentages of a minimum limit in aircraft energy.

4. The interface according to claim 3, wherein the display further comprises third and fourth shutters which indicate maximum and minimum limits in aircraft energy.

5. The interface according to claim 1, wherein the plurality of switches are a memorizing button on a handle at an end of the lever for initiating a memorizing function in which an ordered increase or decrease in the energy of the aircraft is memorized when the lever is operated in a manual mode, or the range of authority is set in which the energy of the aircraft can increase or decrease when the lever is operated in an automatic mode, and a Go-Lever button on the lever which enables the automatic triggering of the flight phase change when the lever is operated in the automatic mode, and wherein the memorizing button is depicted in an ON position when a memorizing function is activated.

6. The interface according to claim 5, wherein the interface display further comprises a mark that is added to the first or second part of the display which symbolizes the ordered increase or decrease, respectively, in the energy of the aircraft corresponding to the position of the lever when the lever is operated in the manual mode, the mark serving to block the first or second shutter, respectively, when the lever is released and the cursor return to the neutral position, and wherein the interface display further comprises a range indicator that is added to the first and/or second part of the display which symbolizes the range of authority in which the energy of the aircraft can increase or decrease, respectively, when the lever is operated in the automatic mode.

7. The interface according to claim 1, wherein the neutral position is identified on the display with an IDLE label.

8. The interface according to claim 6, wherein when a selected automatic mode (ATHR) of operation of the aircraft is selected, the memorizing button is depicted in an OFF position and the Go-Lever button is depicted as including an acronym associated with a mode of aircraft operation, wherein the range display is depicted with first and second bars added to the first or second part of the display with one bar at the neutral position and the other bar at the value ordered by the automatic mode in the increase or decrease, respectively, in the energy of the aircraft, and wherein the range display further includes a flag symbol indicating the value in the increase or decrease in the energy of the aircraft ordered by the automatic mode, and either a reduction in width of the second shutter to prevent the cursor from ordering a brake value where the automatic mode has ordered an increase in aircraft energy or of the first shutter to prevent the cursor from ordering a push value where the automatic mode has ordered a decrease in aircraft energy.

9. The interface according to claim 8, wherein when during a selected automatic mode of operation the cursor goes back to the neutral position, the memorizing button is depicted in an ON position, and the second bar of the range display widens until either a limit of the second shutter is reached where the cursor is positioned in the first part of the display so as to have ordered an increase in aircraft power, thereby making it possible for the pilot to extend the range of the automatic mode such that the second bar of the range is positioned in the second part of the display.

10. The interface according to claim 8, wherein when during takeoff the pilot presses a takeoff (T/O) button on the lever, the acronym depicted on the Go-Lever button is take off (T/O) and a symbol associated with an automatic push mode is displayed in the first part to indicate the value ordered by the automatic push mode to increase aircraft energy to a level corresponding to a mode "FLEX", the first shutter is reduced in length so as to be automatically placed at the value ordered by the automatic push mode, the second and fourth shutters are changed in length so as to be placed respectively at positions to be reached to activate RTO "software" and RTO "MAX" modes of operation, and notches are placed on the second part of the display to present exact positions for activation of the RTO "software" and RTO "MAX" modes of operation.

11. The interface according to claim 8, wherein the display includes a second acronym indicating a mode of operation of the aircraft when the lever is operated in automatic mode.

12. The interface according to claim 4, wherein all of the shutters are delineated in the interface display through the use of different colors for each of the shutters or different shades of a color for each of the shutters versus portions of the first and second parts of the display not covered by the shutters.

13. An human machine interface (HMI) for displaying information relative to the energy of an aircraft, the interface being a vertical display comprising:

a cursor symbolizing a lever handled by a pilot to control the energy of the aircraft, a race including an upper part corresponding to a forward direction in which the lever is moved to increase the energy of the aircraft, a lower part corresponding to a reverse direction in which the lever is moved to decrease the energy of the aircraft, and an idle position located between the upper and lower parts, the cursor being movable so as to follow actual strokes of the lever to increase or decrease the energy of the aircraft, and to return to the idle position in the race when the lever is not being handled, an upper shutter positioned over the upper part of the race which changes in length as the cursor moves in the upper part of the race, the length of the upper shutter symbolizing an ordered value in the increase in the energy of the aircraft, a lower shutter positioned over the lower part of the race which changes in length as the cursor moves in the lower part of the race, the length of the lower shutter symbolizing an ordered value in the decrease in the energy of the aircraft, an upper column having a height symbolizing a current value in actual aircraft push, the upper column changing in height as the actual aircraft push changes and the length of the upper shutter changes in response to the ordered value in the increase in the energy of the aircraft, a lower column having a height symbolizing a current value in actual aircraft braking, the lower column changing in height as the actual aircraft braking changes and the height of the lower shutter changes in response to the ordered value in the decrease in the energy of the aircraft, and a memory button for a selected aircraft push or aircraft deceleration when the lever is operated in a manual mode, and for a range of authority when the lever is operated in an automatic mode, and a Go-Lever button which enables automatic triggering of a flight phase change.

14. The HMI according to claim 13, wherein the vertical display includes a scale to provide measures of ordered and actual values in the increase and decrease in the energy of the aircraft.

15. The HMI according to claim 14, wherein the scale depicts ordered values in the increase and decrease in the energy of the aircraft and actual values of aircraft push as percentages of a maximum limit in aircraft energy, and actual values of aircraft braking as percentages of a minimum limit in aircraft energy.

16. The HMI according to claim 13, wherein the display further comprises second upper and lower shutters which indicate respectively the maximum and minimum limits in aircraft energy.

17. A human machine interface (HMI) for displaying information relative to the energy of an aircraft, the interface being a display comprising:
a depiction of a lever handled by a pilot to control the energy of the aircraft,
a depiction of a race within which the lever moves as the lever handled by the pilot is moved,
indications of a maximum limit of aircraft acceleration and of a minimum limit of aircraft deceleration of the race within which the lever moves,
a depiction of a plurality of buttons, including (1) a memory button for (i) a selected aircraft push or aircraft deceleration when the lever is operated in a manual mode, and (ii) for a range of authority when the lever is operated in an automatic mode, and (2) and a Go Lever which enables automatic triggering of a flight phase change, including: (i) takeoff when the aircraft is aligned for doing so, and (ii) a go-around when the aircraft is in a landing approach phase,
indications of a current, actual value of aircraft forward thrust and a current, actual value of aircraft backward air deceleration or ground braking,
an indication of controlled values, when the lever is operated in a manual mode, of aircraft forward thrust and of aircraft backward air deceleration or ground braking, and when the lever is operated in automatic mode, of aircraft forward thrust and of aircraft backward air deceleration or ground braking,
an indication of a range of authority allocated to forward maximum thrust and backward maximum deceleration, and
an indication of activated automatic modes.

18. The HMI according to claim 17, wherein the activated automatic modes are selected from TOGA, Flex, Climb, Self-delay, Brake-To-Vacate (BTV), Max rejected takeoff (RTO) braking, and Soft RTO optimized braking.

19. The HMI according to claim 18, wherein (i) TOGA is an automatic mode of application of maximum thrust (TOGA thrust); (ii) Flex is an automatic mode using a reduced thrust during takeoff or during go-around compared to the maximum thrust (TOGA); (iii) Climb is an automatic mode using a reduced thrust for the climbing phase compared to the maximum thrust (TOGA); (iv) Self-delay is an automatic mode to reduce the thrust toward the IDLE level during the flare-out phase on landing; (v) Brake-To-Vacate (BTV) is an automatic braking mode to reach an exit ramp at an adequate speed while optimizing runway occupation time and brake wear; (vi) Max rejected takeoff (RTO) braking is a mode which uses all the aircraft's braking capacity following cancellation of take-off; and (vii) Soft RTO optimized braking is a mode following a take-off cancellation.

20. A system for displaying information relative to the energy of an aircraft, the system comprising:
a control unit,
a control interface linked to the control unit by a first link, the control interface being connected to a lever by which a pilot increases and decreases aircraft energy by a plurality of sensors,
a display device linked to the control unit by a second link, the display device including a display comprising:
a cursor symbolizing a lever handled by a pilot to control the energy of the aircraft,
a race including
an upper part corresponding to a forward direction in which the lever is moved to increase the energy of the aircraft,
a lower part corresponding to a reverse direction in which the lever is moved to decrease the energy of the aircraft, and
an idle position located between the upper and lower parts,
the cursor being movable so as to follow actual strokes of the lever to increase or decrease the energy of the aircraft, and to return to the idle position in the race when the lever is not being handled,
an upper shutter positioned over the upper part of the race which changes in length as the cursor moves in the upper part of the race, the length of the upper shutter symbolizing an ordered value in the increase in the energy of the aircraft,
a lower shutter positioned over the lower part of the race which changes in length as the cursor moves in the lower part of the race, the length of the lower shutter symbolizing an ordered value in the decrease in the energy of the aircraft,
an upper column having a height symbolizing a current value in actual aircraft push, the upper column changing in height as the actual aircraft push changes and the length of the upper shutter changes in response to the ordered value in the increase in the energy of the aircraft,
a lower column having a height symbolizing a current value in actual aircraft braking, the lower column changing in height as the actual aircraft braking changes and the height of the lower shutter changes in response to the ordered value in the decrease in the energy of the aircraft, and
a memory button for a selected aircraft push or aircraft deceleration when the lever is operated in a manual mode, and for a range of authority when the lever is operated in an automatic mode, and a Go-Lever button which enables automatic triggering of a flight phase change.

21. The system according to claim 20, wherein the display further includes a scale to provide measures of ordered and actual values in the increase and decrease in the energy of the aircraft.

22. The system according to claim 21, wherein the scale depicts ordered values in the increase and decrease in the energy of the aircraft and actual values of aircraft push as percentages of a maximum limit in aircraft energy, and actual values of aircraft braking as percentages of a minimum limit in aircraft energy.

23. The system according to claim 22, wherein the display further comprises second upper and lower shutters which indicate respectively the maximum and minimum limits in aircraft energy.

* * * * *